(12) United States Patent
Lin et al.

(10) Patent No.: US 10,866,355 B2
(45) Date of Patent: Dec. 15, 2020

(54) BACKLIGHT MODULE AND DISPLAY THEREOF

(71) Applicant: TPK Universal Solutions Limited, Hong Kong (HK)

(72) Inventors: Ming-Chuan Lin, Taichung (TW); Kuo-Hsin Wang, Nantou County (TW); Sheh-Jung Lai, Taichung (TW)

(73) Assignee: TPK Universal Solutions Limited, Wanchai (HK)

( * ) Notice: Subject to any disclaimer, the term of this patent is extended or adjusted under 35 U.S.C. 154(b) by 0 days.

(21) Appl. No.: 16/387,482

(22) Filed: Apr. 17, 2019

(65) Prior Publication Data

US 2019/0317272 A1  Oct. 17, 2019

(30) Foreign Application Priority Data

Apr. 17, 2018  (CN) .......................... 2018 1 0343988

(51) Int. Cl.
*F21V 8/00* (2006.01)

(52) U.S. Cl.
CPC ......... *G02B 6/0088* (2013.01); *G02B 6/0051* (2013.01); *G02B 6/0055* (2013.01)

(58) Field of Classification Search
CPC ... G02B 6/0088; G02B 6/0051; G02B 6/0055
USPC ....................................................... 362/606
See application file for complete search history.

(56) References Cited

U.S. PATENT DOCUMENTS

| | | | | |
|---|---|---|---|---|
| 5,863,114 A | * | 1/1999 | Nagatani ................... | F21V 5/02 362/328 |
| 7,188,990 B2 | * | 3/2007 | Morito ................. | G02B 6/0031 362/611 |
| 2002/0141194 A1 | * | 10/2002 | Wortman ............ | G02B 6/0056 362/309 |
| 2003/0179580 A1 | * | 9/2003 | Ito .......................... | G02B 6/009 362/306 |
| 2006/0002150 A1 | * | 1/2006 | Kim ..................... | G02B 6/0055 362/627 |
| 2006/0092661 A1 | * | 5/2006 | Inoue ................... | G02B 6/0031 362/600 |
| 2007/0139958 A1 | * | 6/2007 | Wu ...................... | G02B 6/0055 362/600 |
| 2013/0258247 A1 | * | 10/2013 | Tang .................... | G02B 6/0023 349/65 |
| 2013/0263488 A1 | * | 10/2013 | Wu ................... | G02F 1/133615 40/773 |

(Continued)

FOREIGN PATENT DOCUMENTS

CN  204629254 U  9/2015
TW  200846777  12/2008

*Primary Examiner* — Bryon T Gyllstrom
(74) *Attorney, Agent, or Firm* — Winston Hsu

(57) ABSTRACT

A backlight module includes a supporting member, a light source, a light guiding film and a colloid. The supporting member has a base plate and an extension cover plate opposite to the base plate. The base plate and the extension cover plate form an accommodating portion and a clamping portion in between. The light source is located at the accommodating portion. The light guiding film is located on the base plate. An end of the light guiding film is located at the clamping portion. The base plate has an extension portion exposed from the light guiding film. The colloid is disposed on the extension portion.

20 Claims, 7 Drawing Sheets

(56) References Cited

U.S. PATENT DOCUMENTS

| | | | |
|---|---|---|---|
| 2014/0063404 A1* | 3/2014 | Chen ..................... | G02B 6/009 349/58 |
| 2014/0340920 A1* | 11/2014 | Bayersdorfer ........... | B60Q 3/54 362/511 |
| 2018/0329134 A1* | 11/2018 | Xu ....................... | G02B 6/0031 |
| 2019/0146145 A1* | 5/2019 | Gu ....................... | G02B 6/0053 362/607 |

* cited by examiner

BACKLIGHT MODULE AND DISPLAY THEREOF

RELATED APPLICATIONS

This application claims priority to China Application Serial Number 201810343988.X, filed Apr. 17, 2018, which is herein incorporated by reference.

BACKGROUND

Technical Field

The present disclosure relates to backlight modules. More particularly, the present disclosure relates to backlight modules applied to display apparatuses.

Description of Related Art

A backlight module is one important component of a liquid crystal display screen. The backlight module provides a light source with sufficient brightness and distribution uniformity to allow the screen to display an image properly.

However, reductions in volume and weight of the backlight module are an important issue. In particular, narrow-border frames are becoming increasingly important for display products, but manufacture of narrow-border screens is subject to new problems that need to be solved. Taking a laptop computer as an example, the backlight module has various optical layers. In order to fix the multiple optical layers, a mechanical fixture such as a thick plastic frame or a metal frame is generally used to increase the strength of the backlight module. The mechanical fixture performs as an outer frame to fix and clamp the side edges of the backlight module. The mechanical fixture has a certain width (such as about 1 mm) regardless of whether the mechanical fixture is a finished product made of metal materials or a plastic product made by an insert molding process. In order to conceal the mechanical fixture from view, the border frame of the product should be at least about 2 to 3 mm wide. In addition, the mechanical fixture has dimension variation in the manufacturing process. The dimension variation of the mechanical fixture affects the precision of assembling the mechanical fixture and the multiple optical layers as well as the optical performance of the backlight module.

SUMMARY

A technical aspect of the present disclosure is to provide a light-weight backlight module, which can achieve an effect of narrow border frames.

According to an embodiment of the present disclosure, a backlight module includes a supporting member, a light source, a light guiding film and a colloid. The supporting member has a base plate and an extension cover plate. The extension cover plate is located above the base plate. The base plate and the extension cover plate define an accommodating portion and a clamping portion in between. The light source is located at the accommodating portion. The light guiding film is located on the base plate. An end of the light guiding film is located at the clamping portion and is clamp by the base plate and the extension cover plate. The base plate has an extension portion exposed from the light guiding film. The colloid is disposed on the extension portion.

In one or more embodiments of the present disclosure, a width of the extension portion is between about 0.2 mm and about 0.5 mm. A width of the colloid is equal to or smaller than the width of the extension portion.

In one or more embodiments of the present disclosure, the base plate has a first side portion and a second side portion. The first side portion extends to form the extension cover plate. The second side portion extends to form the extension portion.

In one or more embodiments of the present disclosure, the extension portion forms an "inverted-U" shape along the side edges of the base plate.

In one or more embodiments of the present disclosure, the supporting member further includes a side plate. The side plate is connected between the base plate and the extension cover plate. The base plate, the side plate and the extension cover plate are an integrally-formed metallic structure.

In one or more embodiments of the present disclosure, the base plate and the extension cover plate further form a gap in between. The gap is located between the accommodating portion and the clamping portion. A width of the gap is between about 1 mm and about 3 mm.

In one or more embodiments of the present disclosure, the extension cover plate has a reflective layer or a reflective surface facing to the base plate. At least a portion of the reflective layer or the reflective surface aligns with the gap. The gap partially aligns with the reflective layer.

In one or more embodiments of the present disclosure, the backlight module further includes a first reflective sheet. The first reflective sheet is located between the light guiding film and the base plate. The gap partially matches with the first reflective sheet. At least a portion of the first reflective sheet aligns with the gap.

In one or more embodiments of the present disclosure, the backlight module further includes a second reflective sheet and a diffusion sheet. The light guiding film is located between the second reflective sheet and the diffusion sheet. The second reflective sheet is located between the light guiding film and the base plate. The diffusion sheet and the light guiding film are adhered to each other by an optical adhesive therebetween, and the light guiding film and the second reflective sheet are adhered to each other by an optical adhesive therebetween.

In one or more embodiments of the present disclosure, the backlight module further includes an assembling member. The assembling member is located between the base plate and the second reflective sheet. The colloid is fixed to the diffusion sheet, the light guiding film, the second reflective sheet and the assembling member. The diffusion sheet, the light guiding film, the second reflective sheet and the assembling member form a surface where the colloid is fixed to.

In one or more embodiments of the present disclosure, the extension cover plate has a supporting portion, a gripping portion and a connecting portion. The connecting portion is located between the supporting portion and the gripping portion. A height of the supporting portion relative to the base plate is higher than a height of the gripping portion relative to the base plate.

According to another embodiment of the present disclosure, a display includes a supporting member, a light source, a light guiding film, a display element and a colloid. The supporting member has a base plate and an extension cover plate. The extension cover plate is opposite to the base plate. The base plate and the extension cover plate define an accommodating portion and a clamping portion in between. The light source is located at the accommodating portion. The light guiding film is located on the base plate. An end of the light guiding film is located at the clamping portion. The base plate has an extension portion exposed from the light guiding film. The display element is located on the light guiding film. The display element and the light guiding film are adhered to each other by a connecting layer in between. The colloid is disposed on the extension portion, and the colloid is connected to a sidewall of the display element.

In one or more embodiments of the present disclosure, the extension cover plate has a supporting portion, a gripping portion and a connecting portion. The connecting portion is located between the supporting portion and the gripping portion. A height of the supporting portion relative to the base plate is higher than a height of the gripping portion relative to the base plate. The supporting portion abuts against the display element.

In one or more embodiments of the present disclosure, the base plate and the extension cover plate further form a gap in between. The gap is located between the accommodating portion and the clamping portion. A width of the gap is between about 1 mm to about 3 mm.

In one or more embodiments of the present disclosure, the base plate has a first side portion and a second side portion. One of the side edges extends to be shaped as the extension cover plate. The other side edges extend outwards to expose from the light guiding film to form the extension portion.

In one or more embodiments of the present disclosure, the supporting member further includes a side plate. The side plate is connected between the base plate and the extension cover plate. The base plate, the side plate and the extension cover plate are integrally formed as a metallic structure.

In one or more embodiments of the present disclosure, the display apparatus further includes a second reflective sheet and a diffusion sheet. The light guiding film is located between the second reflective sheet and the diffusion sheet. The second reflective sheet is located between the light guiding film and the base plate. The diffusion sheet, the light guiding film and the second reflective sheet are respectively adhered to each other by an optical adhesive therebetween.

In one or more embodiments of the present disclosure, the display apparatus further includes an assembling member. The assembling member is located between the base plate and the second reflective sheet. The colloid is fixed to the diffusion sheet, the light guiding film, the second reflective sheet and the assembling member.

In one or more embodiments of the present disclosure, the extension cover plate has a reflective layer on a surface facing to the base plate.

In one or more embodiments of the present disclosure, a width of the extension portion is between about 0.2 mm and about 0.5 mm. A width of the colloid is equal to or smaller than the width of the extension portion.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
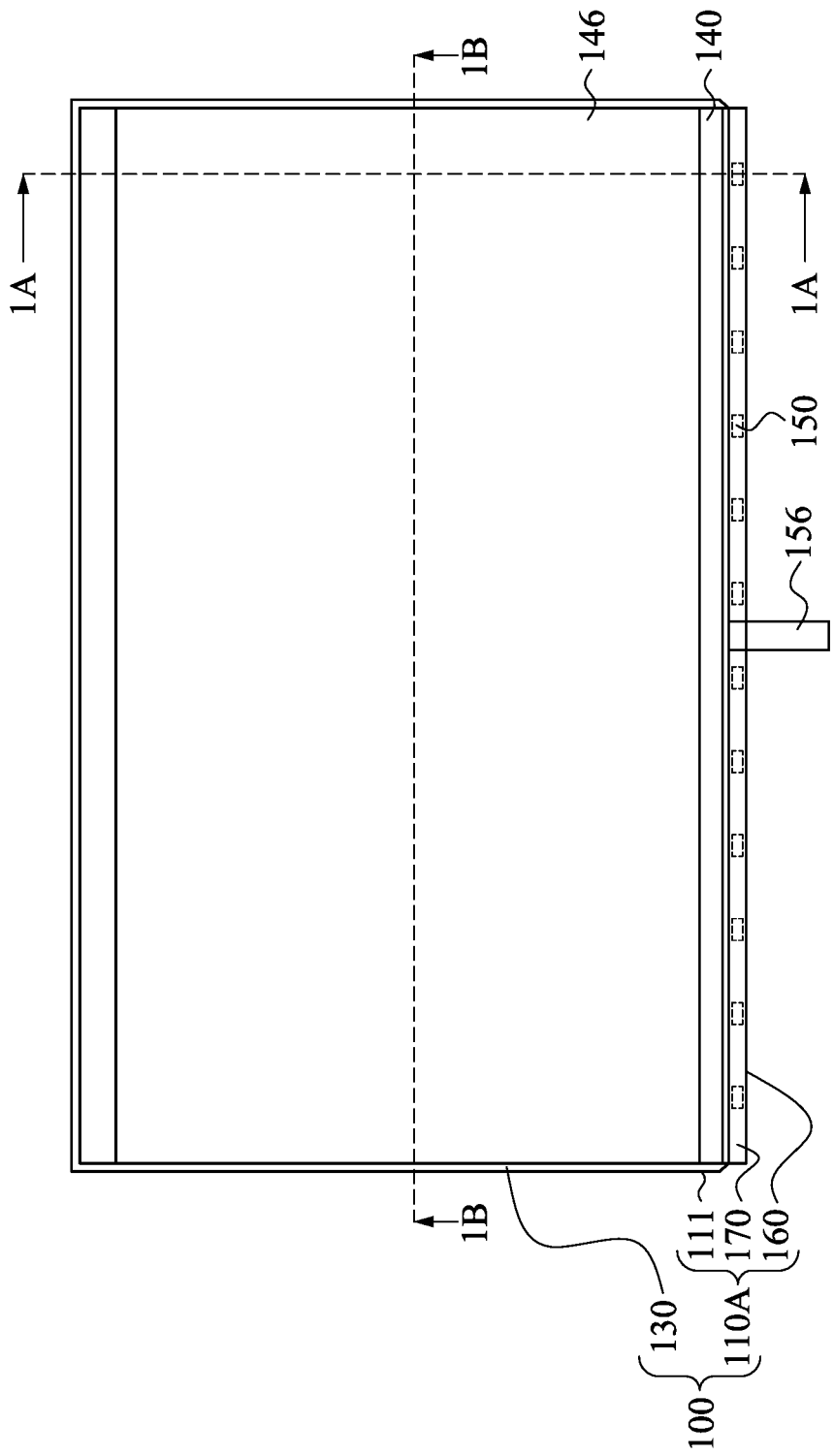
FIG. 1 is a top view of a display apparatus according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The locations, position or relationships of elements in the disclosed embodiments of the present disclosure are referred to the drawings. It is also noted that the terms that "one element is disposed on/below the other element" may mean that the two elements directly contact to each other or mean that the two elements are connected with each other by another layer.

Figure 1A:
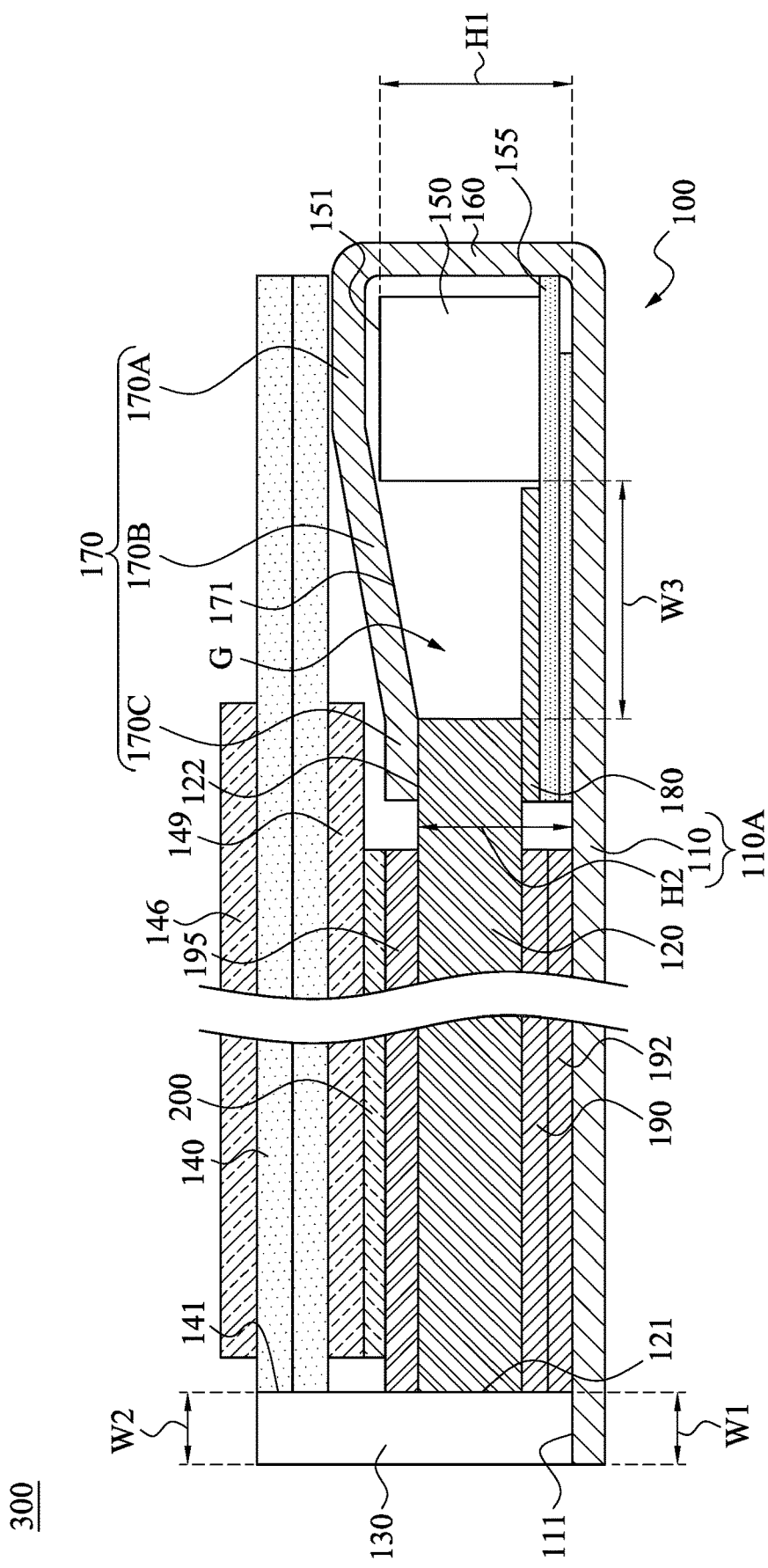
FIG. 1A is a cross-sectional view along the section line 1A-1A in FIG. 1.
Figure 1B:
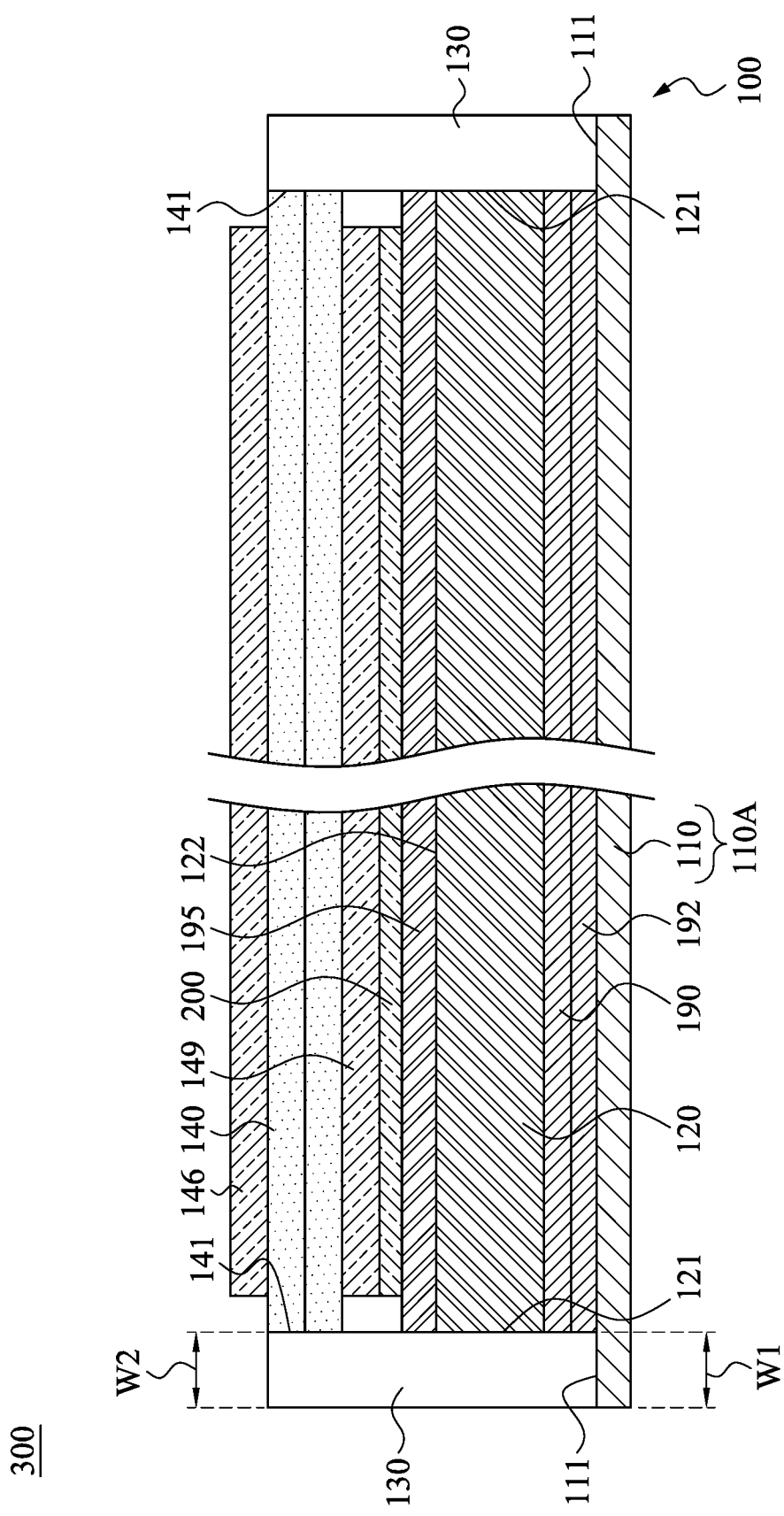
FIG. 1B is a cross-sectional view along the section line 1B-1B in FIG. 1.

FIG. 1 shows a top view of a display 300 according to an embodiment of the present disclosure, and FIG. 1A and FIG. 1B respectively show cross-sectional views along a vertical direction (section line 1A-1A in FIG. 1) and a horizontal direction (section line 1B-1B in FIG. 1) of the display 300. In this embodiment, the display 300 at least includes a backlight module 100 and a display element 140. The display element 140 is located on top of the backlight module 100. A supporting member 110A of the backlight module 100 has a base plate 110 and an extension cover plate 170 disposed above the base plate 110. In other words, the extension cover plate 170 is closer to the user than the base plate 110.

In an embodiment, the supporting member 110A of the backlight module 100 has a base plate 110, an extension cover plate 170 disposed over the base plate 110, and an extension portion 111 defined on the periphery of the base plate 110. A narrower border frame, a lighter weight and a better display effect of a product are achieved by the features of the embodiments of the present disclosure.

Figure 2:
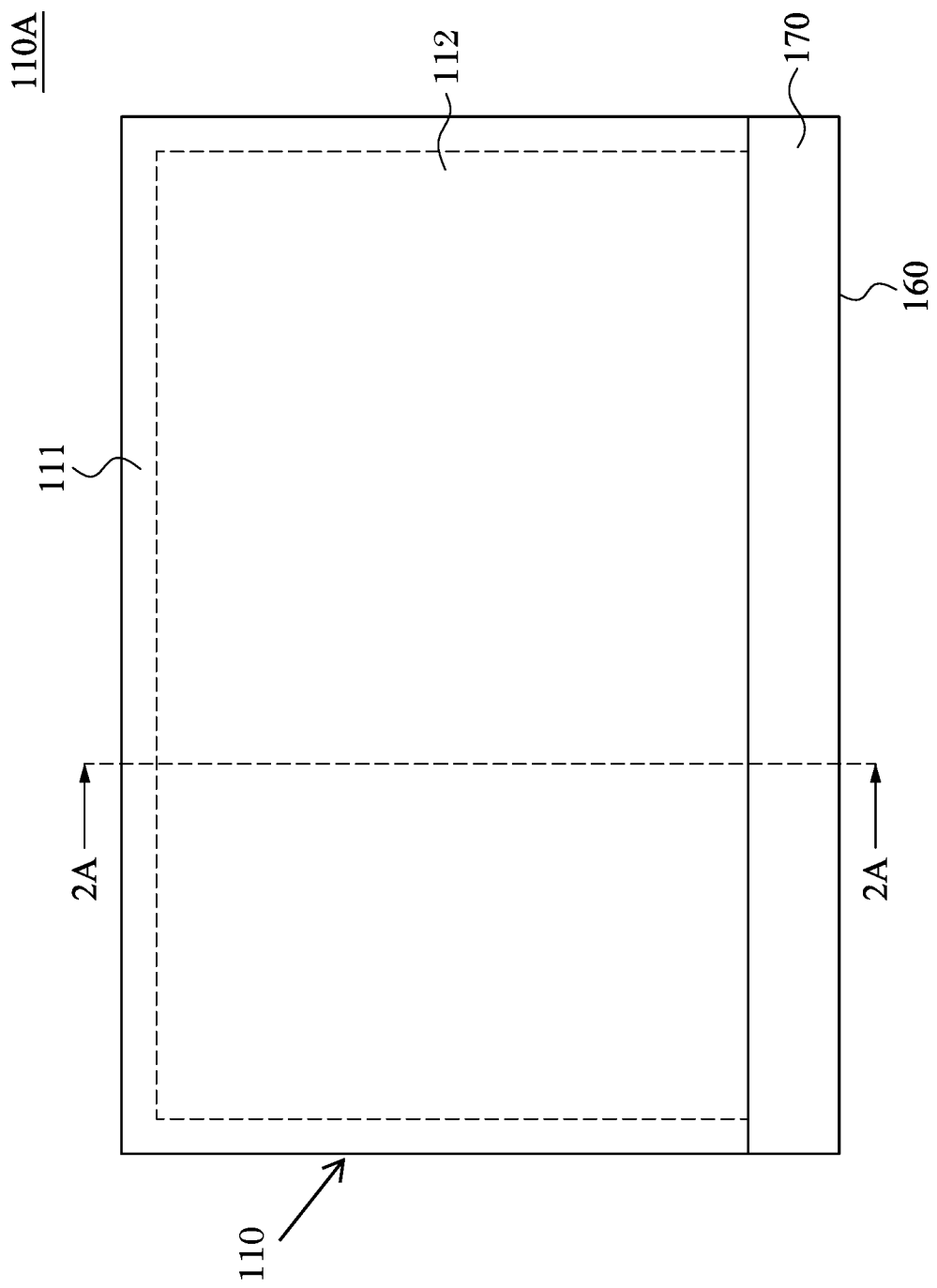
FIG. 2 is a top view of the supporting member in FIG. 1.
Figure 2A:
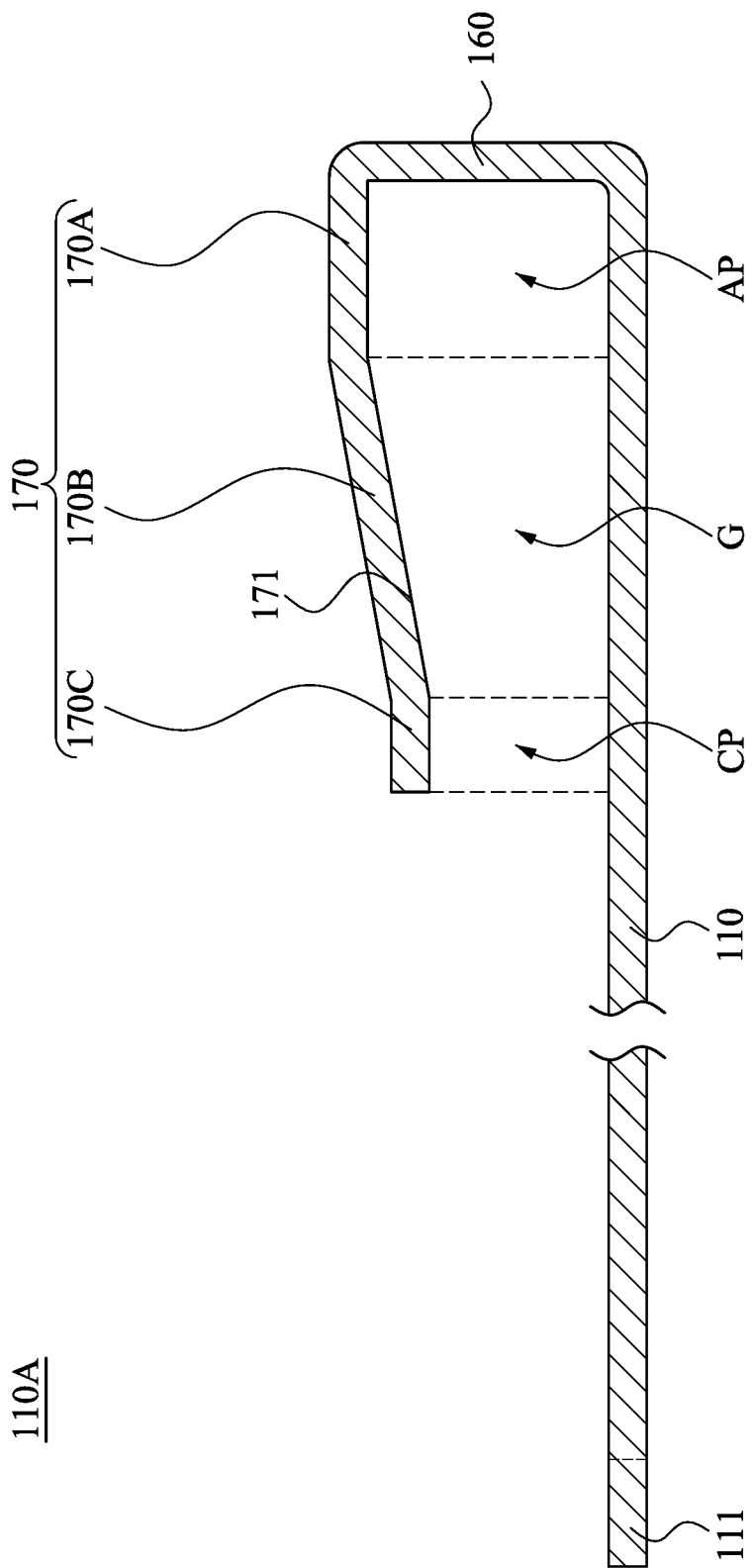
FIG. 2A is a cross-sectional view along the section line 2A-2A in FIG. 2.

FIG. 2 and FIG. 2A show detailed structures of the backlight module 100. As shown in FIG. 1A, FIG. 1B, FIG. 2 and FIG. 2A, the backlight module 100 includes the supporting member 110A, a light guiding film 120, a colloid 130 and a light source 150. In an embodiment, the supporting member 110A has the base plate 110 and the extension cover plate 170. The extension cover plate 170 is opposite to the base plate 110, and is located above the base plate 110. The base plate 110 and the extension cover plate 170 define an accommodating portion AP and a clamping portion CP in between. The light source 150 is located at the accommodating portion AP. The light guiding film 120 is located on the base plate 110. To be specific, an end of the light guiding film 120 is located at the clamping portion CP in a cross-sectional view. The base plate 110 has a main portion 112 covered by the light guiding film 120 and an extension portion 111 which is exposed from the light guiding film 120. In other words, the extension portion 111 extends from the main portion 112, and the light guiding film 120 is not disposed on the extension portion 111 of the base plate 110. The colloid 130 is disposed on the extension portion 111 of the base plate 110.

Preferably, the accommodating portion AP and the clamping portion CP have a space in between, and a gap G described hereafter is substantially defined by the space. The gap G is located between the light source 150 and the light guiding film 120.

In an embodiment of the present disclosure, as shown in FIG. 1A and FIG. 1B, the base plate 110 extends outwards from the main portion 112 to form the extension portion 111 relative to a sidewall 121 of the light guiding film 120. In other words, the light guiding film 120 does not cover the extension portion 111 of base plate 110. Therefore, the sidewall 121 of the light guiding film 120 and the extension portion 111 of the base plate 110 form a structure of "L" shape, such that the colloid 130 can be effectively formed on the extension portion 111 of the base plate 110. For example, a dispenser can be used to dispense a liquid light-curing adhesive, such as optical clear adhesive (OCA) along the sidewall 121 of the light guiding film 120, such that the light-curing adhesive is filled to the "L" shaped structure as mentioned above. The light-curing adhesive is then cured to form the colloid 130, which is able to adhere and fix the base plate 110 and the light guiding film 120, known as a curing and sealing step. In addition, the extension portion 111 of the base plate 110 performs a blocking structure. In the process that the light-curing adhesive is coated and flows along the sidewall 121 of the light guiding film 120, the problem of overflow of the light-curing adhesive can be prevented because any excess adhesive is blocked from flowing out of the base plate 110 by the blocking structure.

A width W1 of the extension portion 111 is the distance that the base plate 110 extends outwards relative to the sidewall 121 of the light guiding film 120. The width W1 is designed at least by the following factors: a border frame width of the end product, and the ability to solve the problem of overflow of the adhesive/glue as mentioned above. To be specific, the smaller the width W1 of the extension portion 111, the more the border frame width of the end product, such as a display device, can be reduced. On the contrary, if the width W1 is too small, the problem of overflow of the adhesive/glue as mentioned above may occur. In an embodiment of the present disclosure, the width W1 of the extension portion 111 can be between about 0.2 mm and about 0.5 mm, preferably 0.3 mm considering the trade-off between the above two factors. However, this does not intend to limit the present disclosure. As compared to a width of traditional assembly components, the width W1 of the embodiment of the present disclosure can be reduced by about 70%, and the border frame width of end products can be at least narrowed by 50%.

In an embodiment, in order to achieve the optimized usage of interior space and to maintain the structural strength, the L-shaped structure is preferably fully filled with the colloid 130, and the colloid 130 entirely covers the extension portion 111. Under such a condition, a width W2 of the colloid 130 is equal to the width W1 of the extension portion 111. Alternatively, the width W2 of the colloid 130 can be smaller than the width W1 of the extension portion 111 so as to lower the possibility of overflow of the adhesive/ glue out of the extension portion 111. In other words, the colloid 130 partially covers the surface of the extension portion 111.

Reference is made to FIG. 1, FIG. 1A, FIG. 1B and FIG. 2. In an embodiment, the base plate 110 can be a rectangular structure, which has 4 side portions, namely the upper, bottom, left and right side portions surrounding the main portion 112. The main portion 112 of the base plate 110 is substantially a central portion covered by the light guiding film 120. The bottom side portion (i.e., the first side portion) of the base plate 110 bends upwards and extends to be folded as the extension cover plate 170, so as to form the accommodating portion AP and the clamping portion CP as mentioned above. In other words, the extension cover plate 170 is connected with a side (i.e., the bottom side) of the main portion 112 of the base plate 110. The accommodating portion AP is a location used to dispose the light source 150, and the clamping portion CP clamps an end (i.e., a bottom end) of the light guiding film 120, so as to fix the light guiding film 120 on the base plate 110. One or more side portions, i.e., a second side portion of the base plate 110, extends from the main portion 112 to form the extension portion 111. Relative to the light guiding film 120, the extension portion 111 is exposed from the light guiding film 120. In the embodiment, the three side portions, including the upper, left and right side portions, of the base plate 110 extend outwards to expose from the light guiding film 120 to form the inverted U-shaped extension portion 111. The colloid 130 performs as the sealant on the extension portion 111 to seal and fix the light guiding film 120 with the supporting member 110A. In other words, the "L" shaped structures are formed by the upper sidewall (i.e., the sidewall 121 shown in FIG. 1A), the left sidewall and the lower sidewall (i.e., the two sidewalls 121 shown at left and right sides of FIG. 1B) of the light guiding film 120 with the extension portion 111, and the colloid 130 fills into the "L" shaped structures so as to assemble the light guiding film 120 with the supporting member 110A. The surrounding colloid 130 also protects the light guiding film 120/end products from moisture. As shown in FIG. 1, FIG. 1A, and FIG. 1B, three side surfaces, namely upper, right and left side surfaces of the light guiding film 120 are sealed with the colloid 130.

As shown in FIG. 1, from the view point of the user, the light source 150 emits lights from the bottom of the backlight module 100. By entering into the light guiding film 120 from the bottom end of the light guiding film 120, the light is evenly scattered, so as to provide light for the display element 140 in front of the backlight module 100. The colloid 130 is usually used to define the positions/dimensions of the border frame of the end products. In order to avoid the leakage of light from the backlight module 100, the colloid 130 is preferably made of a light-curing adhesive of black or dark colors. In an embodiment, the extension portion 111 along the edges (including the upper, left and right side edges) of the base plate 110 forms a protrusion structure of an "inverted-U" shape, a U shape or a circular-arc shape. The colloid 130 is able to correspondingly form a fixing frame of an "inverted-U" shape, a U shape or a circular-arc shape. Moreover, the upper border frame, the left border frame and the right border frame of the end products (e.g., electronic devices such as display screens) also form an outer border of an "inverted-U" shape, a U shape or a circular-arc shape corresponding to the extension portion 111 and/or the colloid 130 as mentioned above.

As mentioned above, as the width W2 of the colloid 130 can be smaller than or equal to the width W1 of the extension portion 111, and the width W2 is smaller than a width of traditional assembly components, the display 300 having the backlight module 100 according to the embodiment of the present disclosure may have a narrow border frame. Compared to the backlight module traditionally using thicker and heavier assembly components, the weight of the backlight module 100 according to the embodiment of the present disclosure may be reduced. In addition, the manufacturing process of the colloid 130 is efficiently performed (such as the dispensing process as mentioned above) and has a higher precision than the traditional process having dimension deviations in mechanical assembly. On the other hand, the production cost of the backlight module 100 according to the embodiment of the present disclosure can be effectively reduced while the yield rate can be increased.

In this embodiment, as shown in FIG. 1A and FIG. 2A, the supporting member 110A of the backlight module 100 further includes a side plate 160. The side plate 160 is connected between the base plate 110 and the extension cover plate 170. Preferably, the base plate 110, the side plate 160 and the extension cover plate 170 are integrally formed by a metallic row material. In other words, the base plate 110, the side plate 160 and the extension cover plate 170 are made by a piece of metal material. To be specific, a portion of the metallic row material is defined as the base plate 110. Then a side portion of the base plate 110 bends to form the side plate 160, and a free end of the side plate 160 bends again and the metallic row material is folded as the extension cover plate 170 above the base plate 110. The base plate 110, the side plate 160 and the extension cover plate 170 can form a space therebetween, and the space may be defined as the accommodating portion AP and the clamping portion CP. Preferably, at least one peripheral portion of the metallic row material is defined as the extension portion 111 connected with the main portion 112 of the base plate 110. In an embodiment, the side plate 160 is located at a side of the light source 150 distal from the light guiding film 120, and is substantially perpendicular with the base plate 110. The extension cover plate 170 is connected to an end of the side plate 160. The free end (i.e., the gripping portion 170C described below) of the extension cover plate 170 is in contact with an upper surface 122 of the light guiding film 120. The elasticity produced by the free end of the extension cover plate 170 forces on the end (i.e., lower end) of the light guiding film 120 so as to fix the light guiding film 120 and to maintain the location of the light guiding film 120.

As shown in FIG. 1A, the light source 150 is located on the base plate 110, and is located at a side of the light guiding film 120 away from the colloid 130. In an embodiment, the light source 150 can be a light emitting diode (LED) disposed on a circuit board 155 on the base plate 110. In other words, the light source 150 is located between the extension cover plate 170 and the circuit board 155. The light source 150 is able to emit light towards the light guiding film 120. Preferably, the circuit board 155 further has a bonding area 156, such as bonding pads on a flexible circuit board. The bonding area 156 extends and protrudes out of the supporting member 110A through a hole on the supporting member 110A, so as to electrically connect with an external controller (not shown). In this embodiment, as shown in FIG. 1A, the light source 150 and the light guiding film 120 have the gap G in between. In other words, the space formed by the base plate 110, the side plate 160 and the extension cover plate 170 can be divided into three sections, which are the accommodating portion AP, the clamping portion CP, and the gap G between the accommodating portion AP and the clamping portion CP. Due to air contained in gap G, diffusion of light occurs in the gap G, so as to avoid the spotlight issue at the entrance of the light guiding film 120, namely the brightness at the light incidence plane is larger than that on other areas. For example, a range of a width W3 of the gap G is between about 1 mm and about 3 mm, preferably between about 1 mm and about 1.5 mm. However, this does not intend to limit the present disclosure.

In an embodiment, a height H1 (i.e., the distance of an upper surface 151 of the light source 150 relative to the base plate 110) is higher than a height H2 (i.e., a distance of an upper surface 122 of the light guiding film 120 relative to the base plate 110). In other words, by referring the base plate 110 as the baseline, a height of the light source 150 is higher than a height of the light guiding film 120. In order to comply with the height difference between the light source 150 and the light guiding film 120, the extension cover plate 170 in this embodiment can be formed as an asymmetric structure. To be specific, the extension cover plate 170 has a supporting portion 170A, a gripping portion 170C and a connecting portion 170B located between the supporting portion 170A and the gripping portion 170C. The gripping portion 170C can be referred as the free end of the extension cover plate 170. The supporting portion 170A is connected with the side plate 160. A height of the supporting portion 170A relative to the base plate 110 is higher than a height of the gripping portion 170C relative to the base plate 110. The connecting portion 170B inclines and extends from the supporting portion 170A to the gripping portion 170C. Thus, the space (i.e., the accommodating portion AP) formed by the higher supporting portion 170A and the base plate 110 can be used to accommodate the light source 150 of a higher height, and the space (i.e., the clamping portion CP) formed by the lower gripping portion 170C and the base plate 110 can be used to accommodate the light guiding film 120 of a lower height. Using the design of unequal heights (referring the base plate 110 as the baseline) as mentioned above, the height of products after assembling the backlight module 100 and the display element 140 of this embodiment can be effectively reduced. In an embodiment, a width (also a width of the light guiding film 120 being gripped and fixed) of the gripping portion 170C is between about 1 mm and about 2 mm, preferably 0.5 mm.

Figure 3:
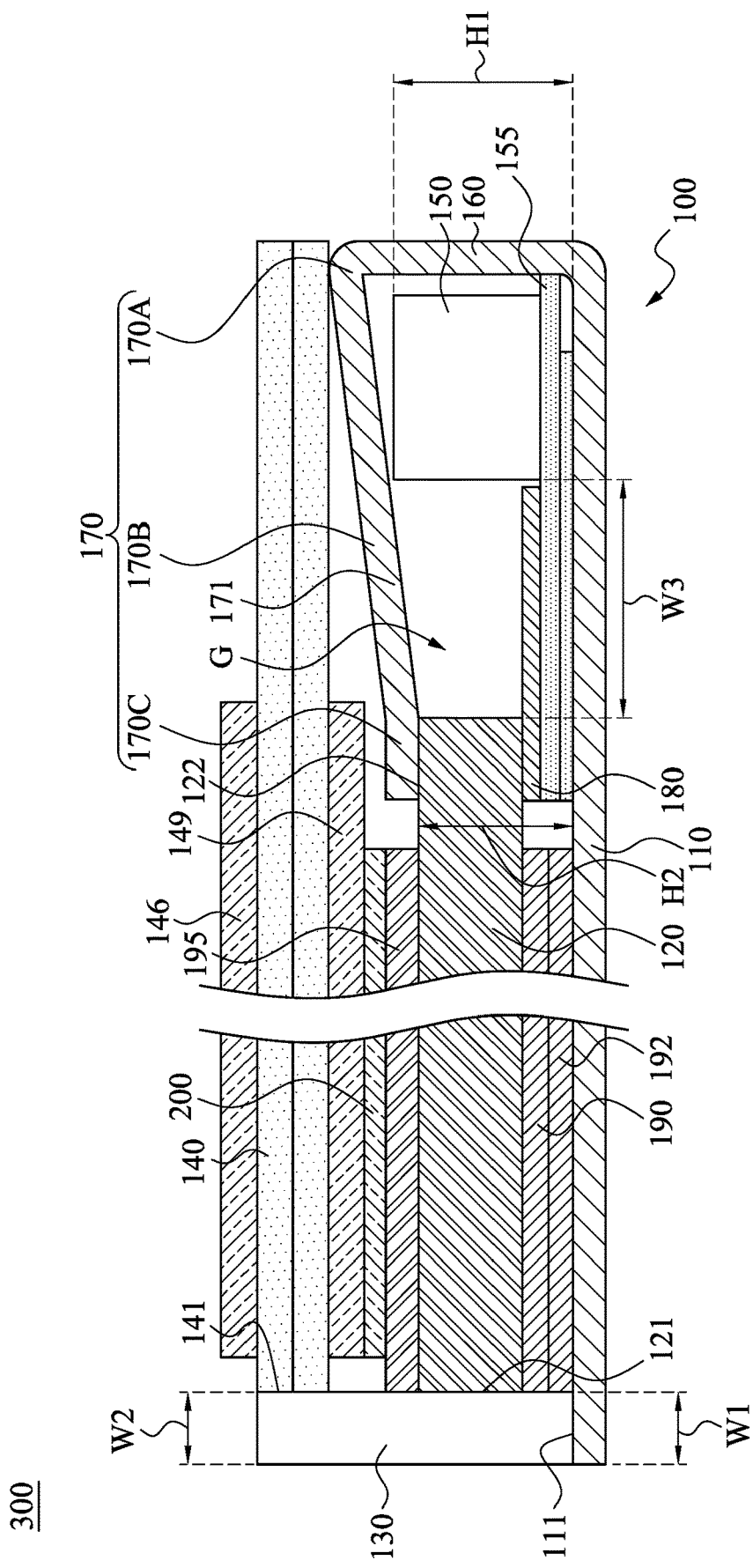
FIG. 3 is a cross-sectional view of a display apparatus according to another embodiment of the present disclosure.

It is worth to illustrate that, the relations between positions of the three sections, e.g., the supporting portion 170A, the connecting portion 170B and the gripping portion 170C, and the three rooms, e.g., the accommodating portion AP, the gap G and the clamping portion CP are not restricted to substantially match with. For example, for the embodiment as shown in FIG. 3, the supporting portion 170A just refers to the bending part, which is connected between the side plate 160 and the extension cover plate 170. The connecting portion 170B inclines and extends to the gripping portion 170C from the bending part. Thus, the locations of both the accommodating portion AP and the gap G are substantially defined by the connecting portion 170B between the base plate 110.

On the other hand, the integrally-formed metallic structure of the base plate 110, the side plate 160 and the extension cover plate 170 can also be named as an outer frame, which is used to fix the position of the light source 150 and to strengthen the overall structural strength of the backlight module 100. In detail, by introducing the metallic outer frame, the required overall structural strength of the backlight module 100 for the products can still be maintained though the presented backlight module 100 has weaker-strength elements, for example, the thin colloid 130 or the thin light-guide film.

On the other hand, there is a reflective element on either side of the gap G. The extension cover plate 170 has a reflective layer 171 on a surface (i.e., the inner surface) facing to the base plate 110 and the reflective layer 171 is located on an upper side of the gap G. For example, a reflective material can be coated or attached to the surface of the mentioned integrally-formed metallic structure, and then the metallic structure attached with the reflective material is processed to fold/bend or to form the base plate 110, the extension portion 111, the side plate 160 and the extension cover plate 170. Alternatively, the metallic material with a high reflective surface may be chosen to fold/bend or to form the base plate 110, the extension portion 111, the side plate 160 and the extension cover plate 170. In other words, the reflective surface of the metallic material is located on the upper side of the gap G. In an embodiment, the location of the reflective layer 171/reflective surface corresponds to the location of the gap G. For example, the reflective layer 171 partially aligns with the gap G and covers on the gap G, so as to increase the amount of light entering into the light guiding film 120 and to reduce the leakage of light through the extension cover plate 170. In another embodiment, the reflective layer 171 is formed in the entire inner surface of the extension cover plate 170. Moreover, the backlight module 100 further includes a first reflective sheet 180 formed on the bottom side of the gap G. The first reflective sheet 180 is located between the light guiding film 120 and the base plate 110, and the location of the first reflective sheet 180 corresponds to the location of the gap G. For example, the first reflective sheet 180\ partially aligns with the gap G and located below the gap G. Alternatively, the first reflective sheet 180 is disposed on the circuit board 155. A first portion of the first reflective sheet 180 aligns with the gap G, and a second portion is disposed under the light guiding film 120. Similarly, the configuration of the first reflective sheet 180 increases the amount of light entering into the light guiding film 120 and to reduce the leakage of light.

Preferably, the backlight module 100 comprises both the reflective layer 171/reflective surface and the first reflective sheet 180, as shown in FIGS. 1A and 2A. Thus, the gap G is located between the reflective layer 171 of the extension cover plate 170 and the first reflective sheet 180. When diffusion of light is carried out by air in the gap G, the reflective layer 171 of the extension cover plate 170 and the first reflective sheet 180 reflect the diffused light back to the light guiding film 120, so as to increase the light reflective rate in the gap G to increase the brightness of the display product and to reduce the light leakage. For example, both the reflectance of the reflective layer 171 of the extension cover plate 170 and the first reflective sheet 180 can be more than 98%. However, this does not intend to limit the present disclosure. In another embodiment, the reflective layer 171 and the first reflective sheet 180 can be selectively or alternatively used, namely, the first reflective sheet 180 is located above the gap G and the reflective layer 171 is located underneath the gap G.

In addition, as shown in FIGS. 1A and 1B, the backlight module 100 further includes a second reflective sheet 190 and a diffusion sheet 195. The light guiding film 120 is located between the second reflective sheet 190 and the diffusion sheet 195. The second reflective sheet 190 is located between the light guiding film 120 and the base plate 110. The diffusion sheet 195, the light guiding film 120 and the second reflective sheet 190 are adhered together by an optical adhesive. In other words, the diffusion sheet 195 and the light guiding film 120 are adhered to each other by the optical adhesive, and the light guiding film 120 and the second reflective sheet 190 are adhered to each other by the optical adhesive. By introducing the full lamination (i.e., no air gap disposed between two adjacent layers) of the diffusion sheet 195, the light guiding film 120 and the second reflective sheet 190 by the optical adhesive, the relative positions between the diffusion sheet 195, the light guiding film 120 and the second reflective sheet 190 can be fixed, such that the strength of overall structure of the laminated layers can be improved. In an embodiment, the light guiding film 120 is different from a traditional light guiding plate formed by injection molding. The light guiding film 120 is a film-type material which has the advantages of thin thickness and light weight. By the method of full adhesion/lamination, the diffusion sheet 195, the light guiding film 120 and the second reflective sheet 190 can be integrated as a light-weighted and thinned optical stackup structure. The full laminated optical stackup structure has passed a bending test, and no relative displacement between the layers in the optical stackup structure occurs.

In an embodiment, the backlight module 100 further includes an assembling member 192. The assembling member 192 is located between the base plate 110 and the second reflective sheet 190. This embodiment of the present disclosure provides a method for assembling the backlight module. The diffusion sheet 195 is adhered to the upper surface 122 of the light guiding film 120, and then the second reflective sheet 190 is adhered to the lower surface of the light guiding film 120. Next, the assembling member 192 (as a metallic part) is adhered to the second reflective sheet 190. Then, the lamination of assembling member 192, the second reflective sheet 190, the light guiding film 120 and the diffusion sheet 195 is assembled to the supporting member 110A, such that the assembling member 192 is fixed to the base plate 110 by a glue, and an end of the light guiding film 120 is clamped by the extension cover plate 170 and fixed at the clamping portion CP. A coating step is performed for coating the optical adhesive along the side surface of the stackup structure (including the assembling member 192, the second reflective sheet 190, the light guiding film 120 and the diffusion sheet 195), and the optical adhesive flows to fill the L-structure constructed by the side surface of the stackup structure and the extension portion 111.

As mentioned, the extension portion 111 is used to stop the flow of the optical adhesive so as to prevent from the material leakage of the optical adhesive. Finally, the optical adhesive is cured to form the colloid 130 which fix the assembling member 192, the second reflective sheet 190, the light guiding film 120 and the diffusion sheet 195 on the base plate 110, so as to provide desired strength to the stackup structure with the base plate 110. The stackup including the assembling member 192, the second reflective sheet 190, the light guiding film 120 and the diffusion sheet 195 has multiple side surfaces. As shown in FIGS. 1, 1A, and 1B, three side surfaces, namely upper, right and left side surfaces of the stackup are sealed with the colloid 130. Preferably, at least one side surface of the stackup is a co-planar surface. In other words, a side surface of the assembling member 192, a corresponding side surface of the second reflective sheet 190, a corresponding side surface of the light guiding film 120 and a corresponding side surface of the diffusion sheet 195 from a co-planar surface.

As mentioned above, the width of the extension portion 111 according to the embodiment of the present disclosure is controlled to achieve a structure of a narrow border frame for the end products. On the other hand, as compared to the traditional assembly piece, a weight of the colloid 130 formed by curing the optical adhesive is reduced. In addition, by assembling the full laminated optical stackup structure with the base plate 110 by the colloid 130, the light-weighted and thinned backlight module 100 is thus formed.

Please refer to FIGS. 1A and 1B again; display 300 is constructed by assembling the display element 140 and the backlight module 100. The display element 140 is, for example, a liquid crystal panel having a liquid crystal layer sandwiched between two substrates. To be specific, the display element 140 can include a lower substrate (such as a thin film transistor substrate) approximately to the backlight module 100, an upper substrate (such as a color filter substrate) approximately to a viewing side of the user, and a liquid crystal layer sandwiched between the lower and upper substrates. However, this does not intend to limit the present disclosure. The display element 140 is located on the light guiding film 120. The light guiding film 120 is located between the display element 140 and the base plate 110. The display element 140 and the light guiding film 120 are adhered to each other by a connecting layer 200 (such as an optical adhesive, or a glue material) in between. The colloid 130 is disposed on the extension portion 111, and the colloid 130 is connected to the display element 140, the light guiding film 120 and the extension portion 111. In one embodiment, the colloid 130 is connected to a sidewall 141 (i.e., the upper side wall) of the display element 140 as well as the side surface 121 of the light guiding film 120. Thus, the overall structural strength of the backlight module 100 and the display 300 can be further enhanced. As shown in FIGS. 1, 1A, and 1B, three side walls, namely upper, right and left sidewalls of the display element 140 are sealed with the colloid 130. Preferably, at least one sidewall of the display element 140 forms a co-planar structure with the corresponding side surface of the stackup including the assembling member 192, the second reflective sheet 190, the light guiding film 120 and the diffusion sheet 195.

As mentioned above, the extension cover plate 170 has the supporting portion 170A (please refer to FIGS. 1A, 2A and 3). The display element 140 which is assembled on the backlight module 100 abuts against the supporting portion 170A of the extension cover plate 170 so that the display element 140 is contacted and supported by the supporting portion 170A of the extension cover plate 170. Thus, the supporting portion 170A can be used to fix the assembly position of the display element 140. Alternatively, the display element 140 can be supported by the connecting portion 170B. On the other hand, at least a part of the extension cover plate 170 (i.e., the connecting portion 170B) is inclined relative to the base plate 110. The inclined extension cover plate 170 creates spaces for receiving the optical layers of the products. Thus, overall thickness of the assembled display element 140 and backlight module 100 is reduced.

In this embodiment, the display 300 further includes a first polarizer 146 and a second polarizer 149. The display element 140 is located between the first polarizer 146 and the second polarizer 149. The second polarizer 149 is located between the display element 140 and the diffusion sheet 195. In detail, the first polarizer 146 and the display element 140 and the second polarizer 149 are adhered to each other by an optical adhesive therebetween, and the display element 140 and the second polarizer 149 are adhered to each other by an optical adhesive therebetween. In order to integrate the internal structure of the display 300 more dense, an edge of the second polarizer 149/first polarizer 146 retracts inwards relative to the display element 140, so as to avoid structural interference with the extension cover plate 170. In addition, the second polarizer 149 with a smaller size than the display element 140 can be located in the space created by the inclined extension cover plate 170 so as to reduce the overall thickness of the assembled display element 140 and backlight module 100. On the other hand, the side surface of the second polarizer 149/first polarizer 146 does not contact with the colloid 130. Alternatively, at least one of three side walls, namely upper, right and left sidewalls of the second polarizer 149/first polarizer 146 is sealed with the colloid 130. Preferably, the sidewall of the second polarizer 149/first polarizer 146, which contacts with the colloid 130, forms a co-planar structure with the corresponding side surface of the stackup including the assembling member 192, the second reflective sheet 190, the light guiding film 120 and the diffusion sheet 195.

Figure 4:
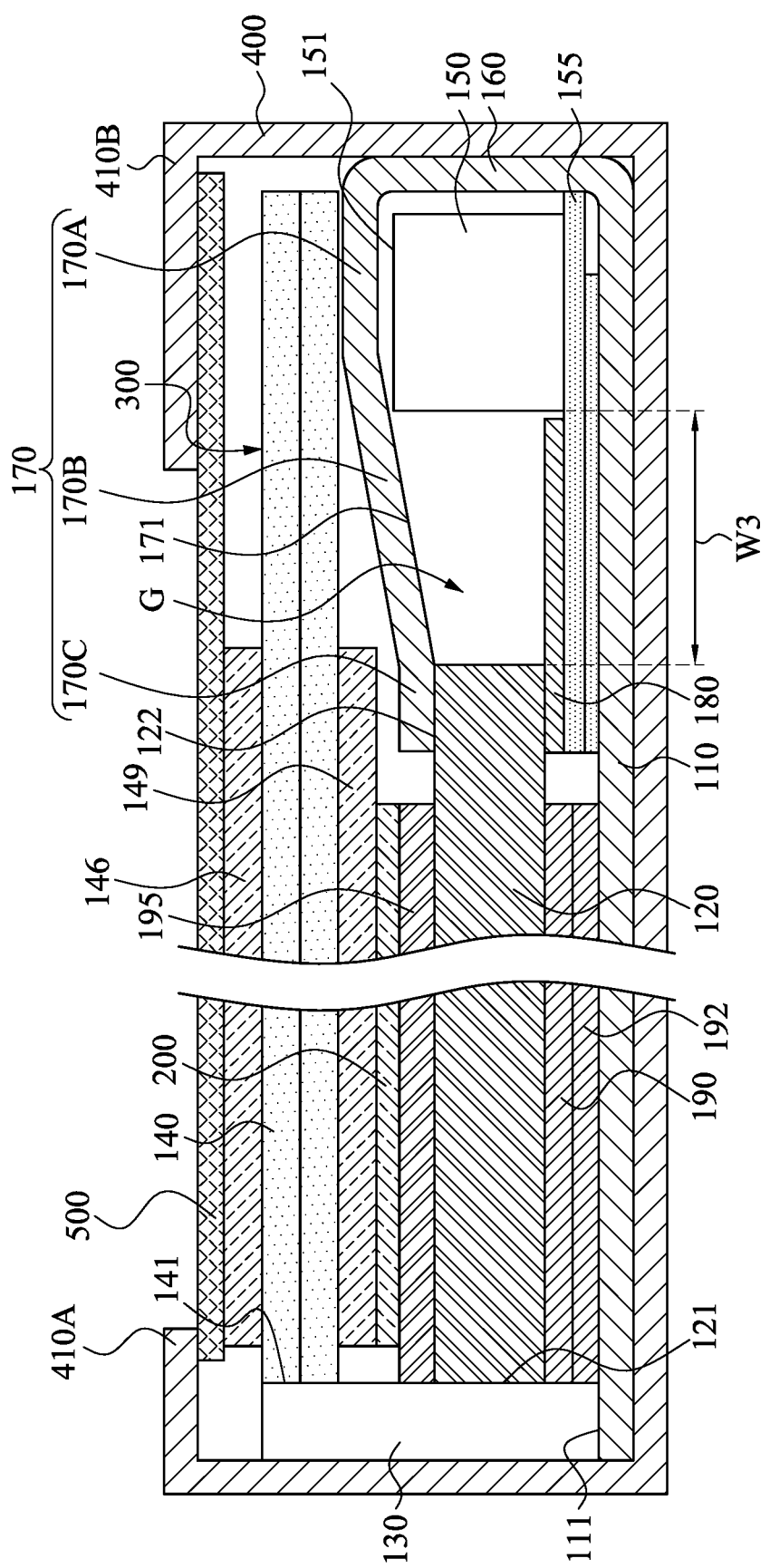
FIG. 4 is a cross-sectional view of an electronic device including the display apparatus of FIG. 1.

FIG. 4 is a cross-sectional view of an electronic device including the display 300 of FIG. 1. The electronic device can be display screens, monitors of portable computers, etc. As shown in FIG. 4, the display 300 can be assembled to an external case 400 and a transparent cover plate 500, so as to form a commercial product. To be specific, the display 300 is contained in the external case 400. Since the width W2 of the colloid 130 is smaller than a width of traditional assembly components, a width of the border frame 410A of the external case 400 can be reduced. As mentioned above, comparing with the traditional electronic devices, the border frame width of end product of the present disclosure can be at least narrow by 50%. It is worth to note that, the border frame 4108 of the external case 400 corresponding to the light source 150 may have a larger width than the side frame 410A, and control buttons, trademarks, or other markings can be disposed on the border frame 4108. As a result, the visual effect of the narrow border frame of the end products is not affected at all.

On the other hand, the transparent cover plate 500 covers the display 300, so as to prevent the damage of the display 300 by an external force. Preferably, the transparent cover plate 500 may be made by glass, reinforced glass or other transparent resin material. Preferably, a touch sensor module (not shown) can be formed on the transparent cover plate 500, such that the end products can have the control function by touching screens. In an embodiment, the transparent cover plate 500 can be made of rigid or flexible materials. For example, materials such as glass, sapphire glass, polyimine (PI), polypropylene (PP), polystyrene (PS), acrylonitrile butadiene styrene (ABS), polyethylene terephthalate (PET), polyvinyl chloride (PVC), polycarbonate (PC), polyethylene (PE), polymethyl methacrylate (PMMA), polytetrafluoroethylene (PTFE) can be used. Moreover, the surface hardness or structural strength of transparent cover plate 500 can be further enhanced by strengthening processes. The transparent cover plate 500 can be assembled to the display 300 by an appropriate method, such as adhesion, attaching, or mechanical assembling, which is well known by a person having ordinary skill in the art and is not described in details here.

The dimension (i.e., the area) of the base plate of the supporting member is slightly larger than that of the light guiding film, and the exposed portions of the base plate from light guiding film is defined as the extension portion. As a result, the sidewall of the light guiding film and the extension portion of the base plate form a space for containing adhesive/glue. The light-curing adhesive is dispensed with the space, and is properly disposed on the extension portion of the base plate, so as to form sealants to the base plate and the light guiding film after curing the adhesive. In addition, the extension portion of the base plate performs a blocking function. When the light-curing adhesive flows along the sidewall of the light guiding film, the extension portion stops the adhesive so that the problem of overflow of the light-curing adhesive can be prevented.

Without the traditional dimension deviation of the mechanical fixture part, the assembling precision of the optical layers of the backlight module is improved, and the optical performance of the backlight module is also enhanced.

The width of the colloid is smaller than or equal to the width of the extension portion, which is smaller than the peripheral dimensions of the traditional devices. As a result, the display apparatus having the presented backlight module has a structure of narrow border frames. As compared to the traditional backlight module using thicker and heavier assembly components, the presented backlight module is lightweight. In addition, the manufacturing processes of dispensing the glue to form the colloid are easily controlled and have a high precision. As compared to the tradition assembly process, the manufacturing yield rate can be increased while the production cost of the presented backlight module/display according to the embodiment of the present disclosure can be effectively reduced. The present disclosure provides a suitable width of extension portion for balancing the trade-off between the width of border frame and the problem of overflow of the light-curing adhesive.

A metal plate is bent/folded to form the base plate, the side plate and the extension cover plate, and the metal plate provides enough strength for the backlight module. Though the colloid and the optical layers are light-weight and small-dimension, the overall structural strength of the backlight module can still meet the requirement for assembling.

The light source and the light guiding film have the gap in between, and light diffusion resulted from the refractive property of the air in the gap occurs. Accordingly, the spotlight issue at the entrance of the light guiding film is solved.

When diffusion of light is carried out by air in the gap, the reflective layer and/or the first reflective sheet reflect the diffused light back to the light guiding film. Accordingly, most of lights are introduced into the light guide film so as to increase the brightness of the display and also to reduce the undesired light leakage.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A backlight module, comprising:
 a supporting member having a base plate and an extension cover plate over the base plate, wherein the base plate and the extension cover plate define an accommodating portion and a clamping portion in between;
 a light source located at the accommodating portion;
 a light guiding film located on the base plate, wherein an end of the light guiding film is located at the clamping portion, and the base plate comprises an extension portion exposed from the light guiding film; and
 a colloid disposed on the extension portion, wherein the colloid is in direct contact with the extension portion and a sidewall of the light guiding film.

2. The backlight module of claim 1, wherein a width of the extension portion is between about 0.2 mm and about 0.5 mm, and a width of the colloid is equal to or smaller than the width of the extension portion.

3. The backlight module of claim 1, wherein the base plate has a first side portion and a second side portion, the first side portion extends to form the extension cover plate, and the second side portion extends to form the extension portion.

4. The backlight module of claim 3, wherein the extension portion forms an inverted-U shape along edges of the base plate.

5. The backlight module of claim 1, wherein the supporting member further comprises a side plate connected between the base plate and the extension cover plate, wherein the base plate, the side plate and the extension cover plate are integrally formed by a metallic structure.

6. The backlight module of claim 1, wherein the base plate and the extension cover plate further form a gap in between, the gap is located between the accommodating portion and the clamping portion, and wherein a width of the gap is between about 1 mm and about 3 mm.

7. The backlight module of claim 6, wherein the extension cover plate comprises a reflective layer on a surface facing to the base plate, and at least a portion of the reflective layer aligns with the gap.

8. The backlight module of claim 6, further comprising a first reflective sheet located between the light guiding film and the base plate, wherein at least a portion of the first reflective sheet aligns with the gap.

9. The backlight module of claim 1, further comprising a second reflective sheet and a diffusion sheet, wherein the light guiding film is located between the second reflective sheet and the diffusion sheet, the second reflective sheet is located between the light guiding film and the base plate, and wherein the diffusion sheet and the light guiding film are adhered to each other, and the light guiding film and the second reflective sheet are adhered to each other.

10. The backlight module of claim 9, further comprising an assembling member located between the base plate and the second reflective sheet, wherein the colloid is fixed to the diffusion sheet, the light guiding film, the second reflective sheet and the assembling member.

11. The backlight module of claim 1, wherein the extension cover plate has a supporting portion, a gripping portion and a connecting portion formed between the supporting portion and the gripping portion, and a height of the supporting portion relative to the base plate is higher than a height of the gripping portion relative to the base plate.

12. A display, comprising:
 a supporting member having a base plate and an extension cover plate over the base plate, wherein the base plate and the extension cover plate define an accommodating portion and a clamping portion in between;
 a light source located at the accommodating portion;
 a light guiding film located on the base plate, wherein an end of the light guiding film is located at the clamping portion, and the base plate comprises an extension portion exposed from the light guiding film;
 a display element disposed on the light guiding film, wherein the display element and the light guiding film are adhered to each other; and a colloid disposed on the extension portion, wherein the colloid is connected to the display element, the light guiding film and the extension portion.

13. The display of claim 12, wherein the extension cover plate has a supporting portion, a gripping portion and a connecting portion formed between the supporting portion and the gripping portion, a height of the supporting portion relative to the base plate is higher than a height of the gripping portion relative to the base plate, and the supporting portion abuts the display element.

14. The display of claim 12, wherein the base plate and the extension cover plate further form a gap in between, the gap is located between the accommodating portion and the clamping portion, and wherein a width of the gap is between about 1 mm and about 3 mm.

15. The display of claim 12, wherein the base plate has a first side portion and a second side portion, the first side portion extends to form the extension cover plate, and the second side portion extends to form the extension portion.

16. The display of claim 12, wherein the supporting member further comprises a side plate connected between the base plate and the extension cover plate, wherein the base plate, the side plate and the extension cover plate are integrally formed by a metallic structure.

17. The display of claim 12, further comprising a second reflective sheet and a diffusion sheet, wherein the light guiding film is located between the second reflective sheet and the diffusion sheet, the second reflective sheet is located between the light guiding film and the base plate, and wherein the diffusion sheet and the light guiding film are adhered to each other, and the light guiding film and the second reflective sheet are adhered to each other.

18. The display of claim 17, further comprising an assembling member located between the base plate and the second reflective sheet, wherein the colloid is fixed to the diffusion sheet, the light guiding film, the second reflective sheet and the assembling member.

19. The display of claim 12, wherein the extension cover plate comprises a reflective layer on a surface facing to the base plate.

20. The display of claim 12, wherein a width of the extension portion is between about 0.2 mm and about 0.5 mm, and a width of the colloid is equal to or smaller than the width of the extension portion.

\* \* \* \* \*